United States Patent [19]
Benson

[11] Patent Number: 6,111,824
[45] Date of Patent: Aug. 29, 2000

[54] APPARATUS FOR GATHERING AND DISPLAYING INFORMATION ABOUT THE CONTENTS OF ONE OR MORE OPTICAL DISKS STORED WITHIN AN OPTICAL DISK PLAYER

[75] Inventor: Steven R. Benson, Portland, Oreg.

[73] Assignee: LSI Logic Corporation, Milpitas, Calif.

[21] Appl. No.: 09/118,737

[22] Filed: Jul. 17, 1998

[51] Int. Cl.[7] .................................................. G11B 17/22
[52] U.S. Cl. ................................. 369/33; 369/30
[58] Field of Search ................. 369/34, 30, 33, 369/32, 36, 37, 38, 39, 178

[56] References Cited

U.S. PATENT DOCUMENTS

| | | | |
|---|---|---|---|
| 5,463,605 | 10/1995 | Nishida et al. | 369/58 |
| 5,715,216 | 2/1998 | Dang et al. | 369/34 |
| 5,726,957 | 3/1998 | Hisamatsu et al. | 369/30 |
| 5,764,610 | 6/1998 | Yoshida et al. | 369/58 |
| 5,831,947 | 11/1998 | Okazaki et al. | 369/34 |
| 5,883,864 | 3/1999 | Saliba | 369/34 |

Primary Examiner—Tan Dinh

[57] ABSTRACT

An apparatus is presented which gathers information about optical disks (e.g., CDs) stored in an optical disk player and provides this information to a user. The apparatus includes the optical disk player and a computer system coupled to the optical disk player. The optical disk player retrieves data from optical disks, and includes storage for multiple optical disks (i.e. an optical disk cassette). A data transfer unit within the optical disk player transfers information about the contents of one or more optical disks in the cassette to the computer system. The computer system includes a memory unit for storing the information. The memory unit includes system software for controlling the transfer of the information from the optical disk player to the computer system, and for controlling the storing of the information within the memory unit. The computer system may also include a monitor for displaying the information. The apparatus may also include a remote unit coupled to the computer system and having a display device (e.g., an LCD or LED display module) for displaying the information.

17 Claims, 1 Drawing Sheet

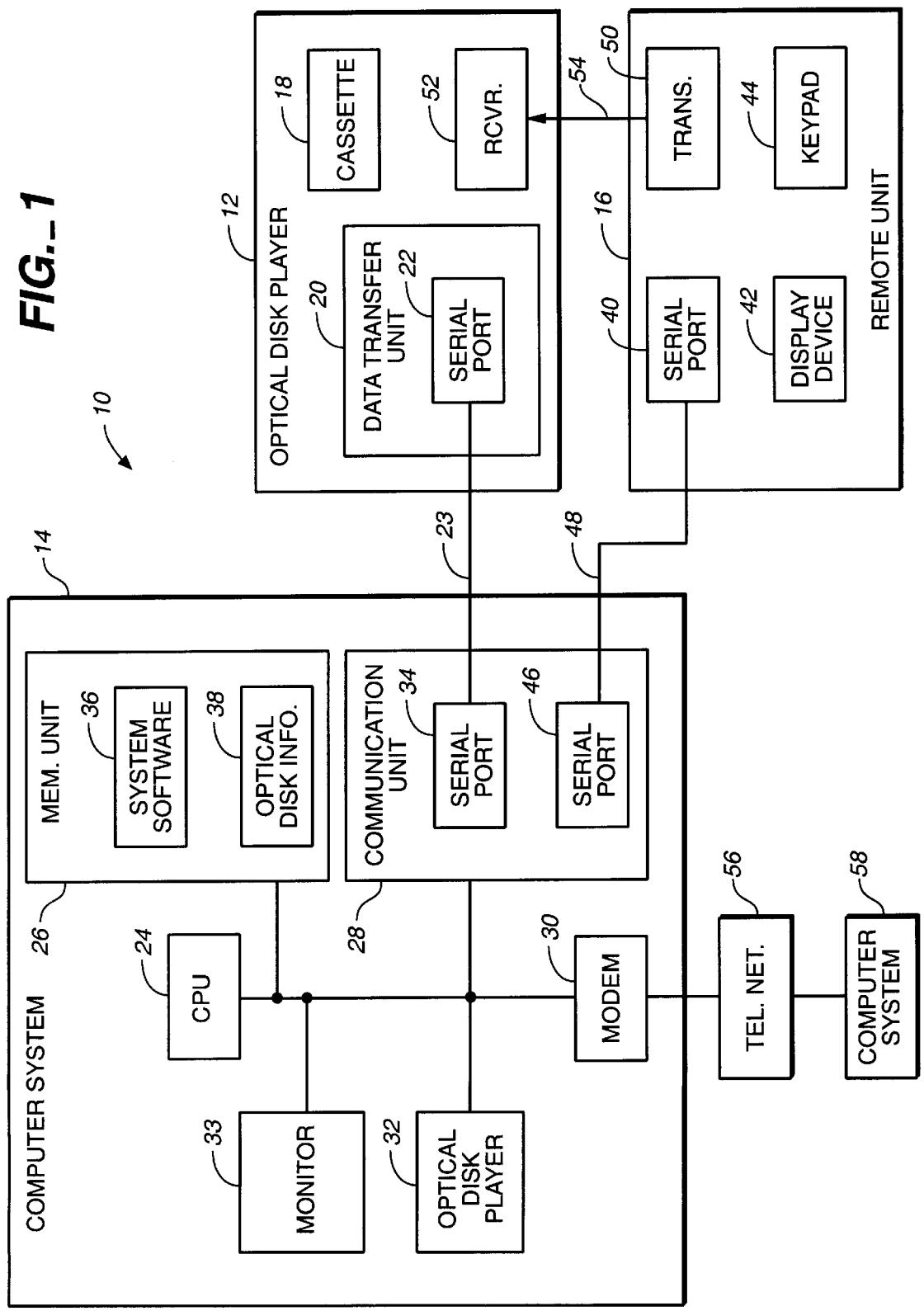
FIG._1

APPARATUS FOR GATHERING AND DISPLAYING INFORMATION ABOUT THE CONTENTS OF ONE OR MORE OPTICAL DISKS STORED WITHIN AN OPTICAL DISK PLAYER

BACKGROUND OF THE INVENTION

1. Field of the Invention

This invention relates to recording devices, and more particularly to optical disk players.

2. Description of Related Art

Optical disks are recording media which typically contain long strings of microscopic pits representing digitally encoded data. Each string of pits is called a "track". The tracks are formed end to end in a spiral pattern around the center of one or both major surfaces of the disk. Reflected laser light is used to "read" the data encoded in the pits. Common types of optical disks available today include compact disks (CDs), laser video disks, and digital versatile disks (DVDs). Various devices are available for recording data upon and reading data from (i.e., "playing") optical disks.

A compact disk includes several data "channels". A main data channel includes audio or other data (e.g., computer programs or data). There may also be 8 "subcode" channels labeled P–W interleaved with the main data channel. The subcode channels were originally included as a means of placing control data on the disk. For example, the P data channel (P-channel) typically includes information indicating the start and end of each track of an audio CD. The Q-channel conveys a table of contents of the CD including timing information associated with each track, as well as the track type (audio or data).

Channels R–W are reserved for subcode graphics (called CD Graphics) and textual information (known as CD Text). Channels R–W allow graphics and text to be displayed while the data stored on the CD is being accessed. CD Graphics is commonly used to provide song lyrics on a display device during playback of an audio CD. The display of the lyrics is synchronized with the song being played. CD Text is used to provide information about the contents of an audio CD on a display device during playback. Such information may include, for example, the artist's name, the album title, and the title of the song being played.

Audio systems typically include CD players for playing audio CDs. Many CD players have cassettes which have multiple "slots" for storing CDs. Over time, it is difficult for a user to remember what CD is in which slot of the cassette, much less the song titles and corresponding track numbers for each CD in the cassette. Thus in order to play a particular song, it is often necessary for the user to first remove the cassette from the CD player to determine if the desired CD is in the cassette. If the desired CD is in the cassette, the user must determine which slot of the cassette the CD occupies. Then the user must determine which track the desired song is recorded on (e.g., by reading the label on the CD). Finally, the user must program the CD player to access the slot which corresponds to the desired CD, and to play the track number which corresponds to the desired song.

It would thus be desirable to have a system which gathers information about optical disks (e.g., CDs) stored in an optical disk player and provides this information to a user. Such a system would greatly simplify selection of a desired track (e.g., song) for playback. Such a system may also allow the user to select a desired track for playback based upon the optical disk information provided.

SUMMARY OF THE INVENTION

The problems outlined above are in large part solved by an apparatus which gathers information about optical disks (e.g., CDs) stored in an optical disk player and provides this information to a user. The apparatus may include the optical disk player and a computer system coupled to the optical disk player. The optical disk player retrieves data from optical disks, and includes storage for multiple optical disks (i.e., an optical disk cassette). A data transfer unit within the optical disk player transfers information about the contents of one or more optical disks in the cassette to the computer system.

Each optical disk within the cassette has a title, and has multiple data groupings (e.g., audio songs, computer data files, etc.) recorded thereupon. Each data grouping has a title, and may be recorded on a separate track of the optical disk. Thus information about the contents of a given optical disk within the cassette includes the title of the optical disk as well as the titles of each data grouping recorded upon the optical disk. Such information may be encoded with the data groupings upon the optical disk.

The computer system includes a memory unit for storing the information about the contents of the optical disks in the cassette. The memory unit includes system software for controlling the transfer of the information from the optical disk player to the computer system, and for controlling the storing of the information within the memory unit.

The apparatus includes the capability to display the information about the contents of the optical disks in the cassette. For example, the computer system may include a monitor for displaying the information. The computer system may also be capable of sending control signals to the optical disk dive in order to allow the user to select a displayed data grouping for playback. User input via a keyboard or pointing device (e.g., a "mouse") may cause the computer to generate such control signals.

The apparatus may also include a remote unit coupled to the computer system and having a display device (e.g., an LCD or LED display module). The remote unit receives the information about the contents of the optical disks in the cassette from the computer system and displays the information via the display device. The remote unit may also include a keypad and means of communicating with the optical disk dive in order to allow the user to select a displayed data grouping for playback.

Some optical disks may not have content information recorded thereupon, or the content information may be insufficient. The user may enter the content information into the computer system manually via the keyboard. In addition, the computer system may include, for example, a modem for connecting to a telephone network in order to receive additional information about the contents of the optical disks in the cassette from an outside source (e.g., another computer system).

BRIEF DESCRIPTION OF THE DRAWINGS

Other objects and advantages of the invention will become apparent upon reading the following detailed description and upon reference to the accompanying drawings in which:

FIG. 1 is a block diagram of one embodiment of an apparatus for gathering and displaying information about the contents of one or more optical disks stored within an optical disk player, and for controlling playback based upon the contents of the optical disk.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

FIG. 1 is a block diagram of one embodiment of an apparatus 10 for gathering and displaying information about the contents of one or more optical disks store within an optical disk player. Apparatus 10 includes an optical disk player 12, a computer system 14, and a remote unit 16. Optical disk player 12 is used to retrieve recorded data from an optical disk. Optical disk player 12 includes a cassette 18 for storing multiple optical disks.

As described above, each optical disk within cassette 18 has a title, and has multiple data groupings (e.g., audio songs, computer data files, etc.) recorded thereupon. Each data grouping has a title, and may be recorded on a separate track of the optical disk. Thus information about the contents of a given optical disk within cassette 18 includes the title of the optical disk as well as the titles of each data grouping recorded upon the optical disk. If a given optical disk is a compact disk (CD), information about the contents of the CD may be recorded thereupon and conveyed via subcode channels R–W during playback as described above.

Optical disk player 12 also includes a data transfer unit 20. Data transfer unit 20 provides information about the contents of optical disks within cassette 18. In the embodiment of FIG. 1, data transfer unit 20 includes a serial port 22 which transmits the information about the contents of optical disks within cassette 18 upon a transmission medium 23. Transmission medium 23 may include, for example, two or more signal lines (i.e., wires). In this case, serial port 23 drives the information about the contents of optical disks within cassette 18 upon the signal lines of transmission medium 23 in serial form (i.e., one binary digit at a time). Information about the contents of optical disks within cassette 18 may also be transmitted from optical disk player 12 to computer system 14 via a modulated beam of light. Accordingly, transmission medium 23 may also be air waves.

Computer system 14 includes a central processing unit (CPU) 24, a memory unit 26, a serial communication unit 28, a modem 30, an optical disk player 32, and a monitor 33. CPU 24 executes instructions. Communication unit 28 is coupled to CPU 24, and is also coupled to transmission medium 23. Information about the contents of optical disks within cassette 18 provided by optical disk player 12 is received by computer system 14 via transmission medium 23 and communication unit 28. In the embodiment of FIG. 1, communication unit 28 includes a serial port 34 connected to transmission medium 23. Serial port 34 receives the information about the contents of optical disks within cassette 18 of optical disk player 12 from transmission medium 23 in serial form, converts the information to parallel form, and provides the information to CPU 24.

Memory unit 26 is coupled to CPU 24, and includes multiple memory cells which store data. Memory unit 26 stores system software 36 and optical disk information 38. Optical disk information 38 includes the information about the contents of optical disks within cassette 18 of optical disk player 12. System software 36 includes instructions executed by CPU 24, and controls both the transfer of the information about the contents of the optical disks and the storing of the information within memory unit 26.

Data transfer unit 20, in coordination with system software 36, may cause optical disk player 12 to scan optical disks within cassette 18 when electrical power is first applied to optical disk player 12 and/or during idle periods of optical disk player 12 (i.e., when optical disk player 12 is not engaged in playback). The information about the contents of optical disks within cassette 18 obtained during such scanning may be used to form an optical disk database within optical disk information 38 in memory unit 26. This database may then be used to allow a user to select a desired data grouping (e.g., song) for playback via monitor 33 or remote unit 16 and user input as described below.

Monitor 33 is coupled to CPU 24, and is used to display information. When CPU 24 executes system software 36, monitor 33 may be used to display the information about the contents of optical disks within cassette 18 of optical disk player 12 stored within optical disk information 38 in memory unit 26. The user may scroll through the information until a desired data grouping to be retrieved (e.g., a desired song to be played) is indicated. By pressing a key on a keyboard (not shown) or a button of a pointing device (e.g., a "mouse", also not shown), a control signal may be generated. The control signal may be conveyed to optical disk player 12 via communication unit 28, transmission medium 23, and data transfer unit 20. The control signal may cause optical disk player 12 to access the correct optical disk and the correct track upon the optical disk to retrieve the desired data grouping (e.g., play the desired song). During playback of a data grouping (e.g., a song), information about the data grouping may be displayed upon monitor 33.

Remote unit 16 includes a serial port 40, a display device 42, and a keypad 44. Remote unit 16 receives the information about the contents of optical disks within cassette 18 of optical disk player 12 from computer system 14, and displays this information upon display device 42. Display device 42 may be, for example, an LCD or LED display module. Display device 42 preferably displays at least one line of text, and the maximum number of alphanumeric characters each line of text may contain is preferably at least 20.

In FIG. 1, communication unit 28 of computer system 14 includes a second serial port 46 coupled to a second transmission medium 48. Transmission medium 48 may include, for example, two or more signal lines (i.e., wires). In this case, serial port 46 drives the information about the contents of optical disks within cassette 18 upon the signal lines of transmission medium 48 in serial form. Serial port 40 of remote unit 16 receives the information about the contents of optical disks within cassette 18 of optical disk player 12 from transmission medium 48 in serial form. During playback of a data grouping (e.g., a song), information about the data grouping may be displayed upon display device 42 of remote unit 16.

As shown in FIG. 1, remote unit 16 may include a transmitter 50, and optical disk player 12 may include a receiver 52. Remote unit 16 communicates with optical disk player 12 via a third transmission medium 54. Transmitter 50 may produce a modulated beam of light, and receiver 52 may receive the modulated beam of light via transmission medium 54. Accordingly, transmission medium 54 may be air waves. Keypad 44 may include several pushbutton electrical switches. The light beam produced by transmitter 50 may be modulated with control signals generated in response to activation of one or more of the pushbutton switches of keypad 44 by a user. Thus the user may control the functions of optical disk player 12 by activating one or more of the pushbutton switches of keypad 44.

For example, display device 42 may display one or more lines of the information about the contents of optical disks within cassette 18 of optical disk player 12. The user may activate one set of pushbutton switches until display device 42 displays a desired data grouping to be retrieved (e.g., a desired song to be played). The user may then press another pushbutton switch which causes transmitter 50 to transmit a light beam modulated with a control signal. Receiver 52 of optical disk player 12 receives the modulated light beam and extracts the control signal. In response to the control signal, optical disk player 12 accesses the correct optical disk and the correct track upon the optical disk to retrieve the desired data grouping (e.g., play the desired song).

Modem 30 is coupled to a telephone network 56, and a second computer system 58 is also connected to telephone network 56. When little or no information about the contents of one or more of the optical disks within cassette 18 of optical disk player 12 is recorded upon the optical disks, modem 30 may be used to access an optical disk database stored within a remote computer system 58. Such access is required for "older" optical disks which do not include recorded content information. The user may also enter information from optical disk packaging (e.g., labels) into optical disk information 38 by typing the information on the keyboard of computer system 14.

Optical disk player 32 is also used to retrieve recorded data from an optical disk, and may include storage positions for multiple optical disks (i.e., a cassette). Information about the contents of one or more optical disks within optical disk player 32 of computer system 14 may also be gathered by system software 36 and stored within optical disk information 38 in memory unit 26. Such information may be displayed on monitor 33 coupled to CPU 24 of computer system 14, and used to access a desired data grouping via user input as described above.

It will be appreciated by those skilled in the art having the benefit of this disclosure that this invention is believed to be an apparatus which gathers information about optical disks stored in an optical disk player and provides this information to a user. It is intended that the following claims be interpreted to embrace all such modifications and changes and, accordingly, the specification and drawings are to be regarded in an illustrative rather than a restrictive sense.

What is claimed is:

1. An apparatus comprising:
   an optical disk player for retrieving data from an optical disk, wherein the optical disk player includes a cassette for storing a plurality of optical disks, and wherein the optical disk player is configured to provide information about the contents of the plurality of optical disks; and
   a computer system coupled to receive the information about the contents of the plurality of optical disks from the optical disk player, wherein the computer system is adapted for connecting to a telephone network in order to receive additional information about the contents of the plurality of optical disks.

2. The apparatus as recited in claim 1, wherein the computer system comprises a memory unit for storing the information about the contents of the plurality of optical disks.

3. The apparatus as recited in claim 2, wherein the memory unit includes system software for controlling the transfer of the information about the contents of the plurality of optical disks from the optical disk player to the computer system, and for controlling the storing of the information within the memory unit.

4. The apparatus as recited in claim 1, wherein at least one of the plurality of optical disks has a data grouping recorded thereupon, and wherein the data grouping has a title, and wherein the information about the contents of the plurality of optical disks includes the title of the data grouping.

5. The apparatus as recited in claim 4, wherein the data grouping is a song.

6. The apparatus as recited in claim 1, wherein the computer system comprises a monitor for displaying the information about the contents of the plurality of optical disks.

7. The apparatus as recited in claim 1, wherein the computer system is configured to provide the information about the contents of the plurality of optical disks.

8. The apparatus as recited in claim 7, further comprising a remote unit coupled to receive the information about the contents of the plurality of optical disks from the computer system.

9. The apparatus as recited in claim 8, wherein the remote unit comprises a display device for displaying the information about the contents of the plurality of optical disks.

10. The apparatus as recited in claim 1, wherein the information about the contents of the plurality of optical disks is transferred from the optical disk player to the computer system serially.

11. The apparatus as recited in claim 8, wherein the information about the contents of the plurality of optical disks is transferred from the computer system to the remote unit serially.

12. An apparatus comprising:
    an optical disk player for retrieving data from an optical disk, wherein the optical disk player includes a cassette for storing a plurality of optical disks, and wherein the optical disk player is configured to provide information about the contents of the plurality of optical disks;
    a computer system coupled to receive the information about the contents of the plurality of optical disks from the optical disk player, wherein the computer system comprises a memory unit for storing the information about the contents of the plurality of optical disks, and wherein the computer system is configured to provide the information about the contents of the plurality of optical disks; and
    a remote unit coupled to receive the information about the contents of the plurality of optical disks from the computer system, wherein the remote unit includes a display device for displaying the information about the contents of the plurality of optical disks.

13. The apparatus as recited in claim 12, wherein the information about the contents of the plurality of optical disks is transferred from the optical disk player to the computer system serially.

14. The apparatus as recited in claim 12, wherein the information about the contents of the plurality of optical disks is transferred from the computer system to the remote unit serially.

15. The apparatus as recited in claim 12, wherein the memory unit includes system software for controlling the transfer of the information about the contents of the plurality of optical disks from the optical disk player to the computer system, and for controlling the storing of the information within the memory unit.

16. The apparatus as recited in claim 12, wherein the computer system is adapted for connecting to a telephone network in order to receive additional information about the contents of the plurality of optical disks.

17. The apparatus as recited in claim 12, wherein the computer system comprises a monitor for displaying the information about the contents of the plurality of optical disks.

* * * * *